H. R. ELLIS.
PROCESS OF EXTRACTING COPPER FROM CARBONATE AND OXID ORES.
APPLICATION FILED JUNE 4, 1914.
1,115,522.
Patented Nov. 3, 1914.
2 SHEETS—SHEET 1.
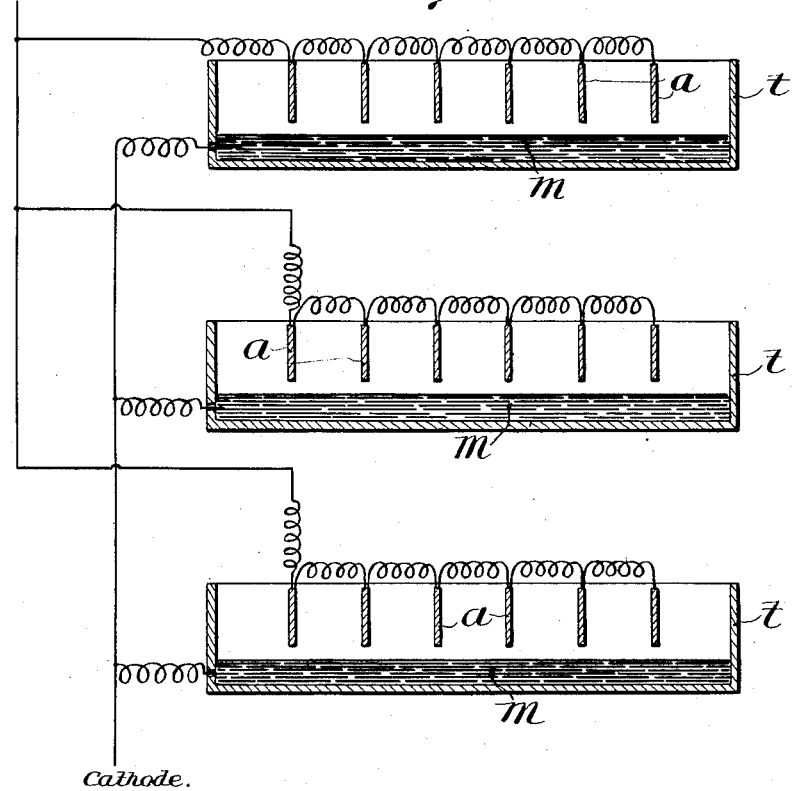
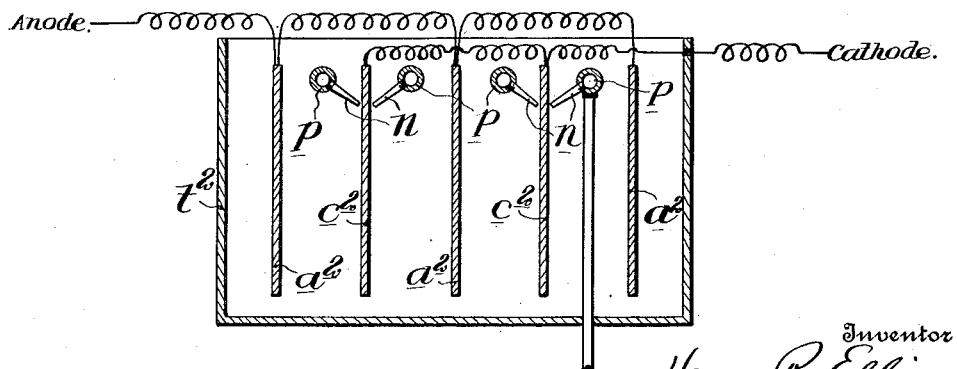

H. R. ELLIS.
PROCESS OF EXTRACTING COPPER FROM CARBONATE AND OXID ORES.
APPLICATION FILED JUNE 4, 1914.
1,115,522.
Patented Nov. 3, 1914.
2 SHEETS—SHEET 2.
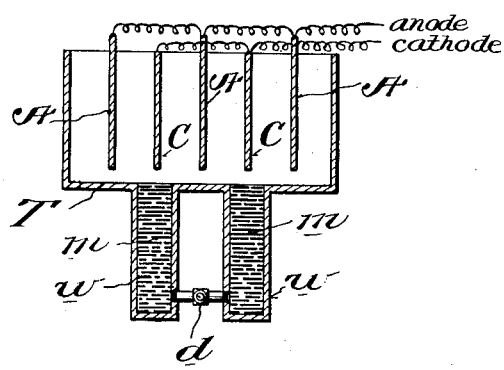
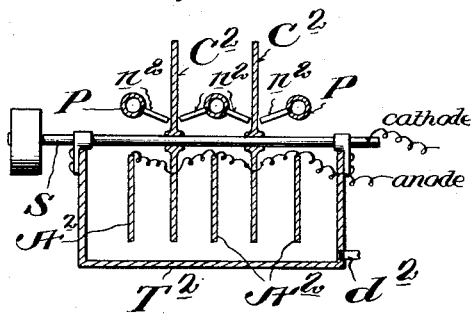
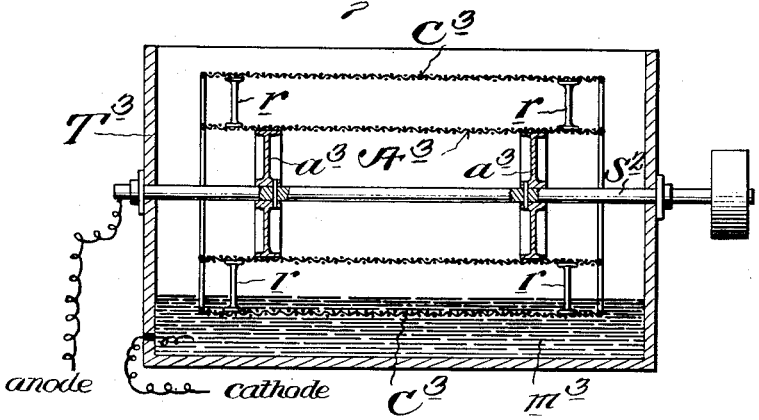
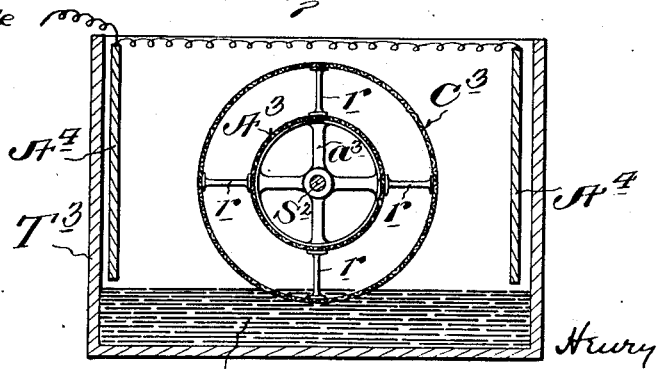

UNITED STATES PATENT OFFICE.

HENRY R. ELLIS, OF SALT LAKE CITY, UTAH.

PROCESS OF EXTRACTING COPPER FROM CARBONATE AND OXID ORES.

1,115,522.  Specification of Letters Patent.  Patented Nov. 3, 1914.

Application filed June 4, 1914. Serial No. 842,942.

*To all whom it may concern:*

Be it known that I, HENRY R. ELLIS, (Case B,) a citizen of the United States, residing at Salt Lake City, in the county of Salt Lake and State of Utah, have invented certain new and useful Improvements in Processes of Extracting Copper from Carbonate and Oxid Ores, of which the following is a specification.

In the patent granted me April 14, 1903, No. 725,548, I have described and claimed a process for the extraction of copper from its carbonate and oxid ores, in which I employed as a solvent a carbonate or bicarbonate of sodium or potassium, or mixtures of the same, and from which the copper in metallic form was extracted by electrolysis and as a sulfid.

My present invention proceeds along the same general principles, but employs, as a specific development of my process, a mercury cathode and an insoluble anode, such as iron, as will be hereinafter more fully described with reference to the drawing, showing several different forms of apparatus for carrying out my process.

Figure 1 is a vertical longitudinal section of one set of apparatus. Fig. 1$^a$ is still another form of somewhat similar character. Fig. 2 is a similar view of another form of apparatus, using mercury in form of spray. Fig. 2$^a$ is a further modification of the same. Fig. 3 is a similar view of still another form of apparatus, using rotating cylinders, and Fig. 4 is a vertical transverse section of the apparatus shown in Fig. 3.

In carrying out my invention I have found that by electrically precipitating the copper upon and into a mercury cathode a current density may be used of many times that which is permissible when a plain copper cathode is used, and at the same time there is maintained a good current efficiency. The difficulty in using a high current density with these solutions when mercury is not used is that the copper comes down in a fine state of subdivision and does not adhere well to the cathode, and consequently is carried away by the solution, but with the mercury cathode the copper is precipitated upon its surface and the copper absorbed or amalgamated by the mercury.

In carrying out the process I prefer to crush the ore to a slime, doing the crushing in the heated solution. The solution, with the slime in suspension, is conveyed to the electrolytic vats and the copper deposited upon the mercury cathodes, while the slimes are held in suspension by the brisk agitation of the solution; in this way, as fast as the copper is taken out of the solution by electrolysis, a fresh supply of copper from the slimes or ores in suspension enters the solution, thus keeping a fairly constant amount of copper in the solution until the slimes have been exhausted of their copper, or of available copper, at which time the electrolytic vats are discharged of the slimes and solution, which are filtered and the solution used over again on a fresh charge. Of course, the solution may be filtered, or the slime settled out, before it enters the electrolytic vats and the clear solution, or practically clear solution, electrolyzed to recover the copper in the form of amalgam. The precipitation may be completely carried out in one tank or in a series of tanks the solution flowing from one to the other.

In carrying out my process there are many ways of using the mercury cathodes in the electrolytic vats. One of the simplest ways is that illustrated in Fig. 1, in which $t$ is a series of tanks superposed one above the other to economize space and each containing a mercury bath $m$ representing the cathode, and $a$ are anode plates of iron. A modification of this is shown in Fig. 1$^a$, in which T is a tank provided with depending wells $w$ filled with mercury $m$. The cathodes C of amalgamated copper plates are suspended above these wells and are capable of being dipped into the wells $w$ into the mercury, and A are the insoluble anodes, of iron.

Another apparatus for carrying out my process is shown in Fig. 2, in which $t^2$ is the tank, $a^2$ the iron anodes, $p$ pipes delivering mercury through nozzles $n$ onto copper plates $c^2$.

In Fig. 2$^a$ T$^2$ is the tank, A$^2$ the iron anodes, and C$^2$ amalgamated copper disks fixed on a revolving shaft S, onto which disks is sprayed mercury from pipes P through nozzles $n^2$, while $d^2$ is the drain pipe. The jets of mercury through nozzles $n^2$ playing against each side of the amalgamated copper disks C$^2$ wash off the copper amalgam formed on the disks. Most of the amalgam and excess mercury falls to the bottom of the vats and is drawn off periodically or continuously, the amalgam strained from the excess of mercury and the mercury pumped back to the jets. The copper is recovered from the amalgam by well-known processes and the mercury used over again. The disks $C^2$ may, if desired, rotate in a subjacent bath of mercury instead of having the mercury jets $n^2$.

A still further form of apparatus for carrying out my process is shown in Figs. 3 and 4, in which $T^3$ is the tank, $S^2$ a revolving shaft carrying iron wheels $a^3$ with an iron anode cylinder $A^3$ of perforated sheet metal or woven wire, around which is concentrically arranged an amalgamated copper drum or cylinder $C^3$ representing the cathode, and connected to and revolving with cylinder $A^3$ and wheels $a^3$ by non-conducting radial supports $r$. The amalgamated copper cathode $C^3$ is formed of woven wire or perforated sheets and it revolves in a subjacent mercury bath $m^3$. If desired, extra iron anode plates $A^4$, Fig. 4, may be employed. The bottom of this tank $T^3$ may be rounded or curved to correspond to the cylinder. Any suitable method of agitating the solution and slime in the vats may be employed, such as revolving paddles, compressed air, steam, reciprocating rakes in bottom of vats, and centrifugal pumps which take the solution from one part of the vat and return it to other parts of the vat.

If for any reason the amalgam becomes hard on the plates, mechanical rubbers may be used to assist to remove it from the plates.

It is to be understood that I consider amalgamated copper plates or any amalgamated surface as the equivalent of mercury in the form of a bath.

1. The process of extracting and recovering copper from its carbonate or oxid ores, or from materials containing the carbonates or oxids of copper, which process consists in subjecting such ores or materials to the action of a solution containing an alkaline carbonate or bicarbonate as described, and then recovering the copper from the copper charged solution by subjecting the same to the action of a cathode consisting of mercury in combination with an insoluble anode.

2. The process of extracting and recovering copper from its carbonate or oxid ores, or from materials containing the carbonates or oxids of copper, which process consists in subjecting such ores or materials to the action of a solution containing an alkaline carbonate or bicarbonate as described, and then recovering the copper from the copper charged solution by subjecting the same to the action of a cathode consisting of an amalgamated surface in combination with an insoluble anode.

In testimony whereof I affix my signature in presence of two witnesses.

HENRY R. ELLIS.

Witnesses:
GEORGE F. WASSON,
A. C. ELLIS, Jr.